United States Patent
Yang

(10) Patent No.: US 11,541,878 B2
(45) Date of Patent: Jan. 3, 2023

(54) VEHICLE AND CONTROL METHOD THEREOF

(71) Applicants: Hyundai Motor Company, Seoul (KR); Kia Motors Corporation, Seoul (KR)

(72) Inventor: Heegun Yang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 227 days.

(21) Appl. No.: 16/654,254

(22) Filed: Oct. 16, 2019

(65) Prior Publication Data

US 2021/0024055 A1   Jan. 28, 2021

(30) Foreign Application Priority Data

Jul. 24, 2019   (KR) .................... 10-2019-0089789

(51) Int. Cl.
*B60W 30/06*   (2006.01)
*B62D 15/02*   (2006.01)
(Continued)

(52) U.S. Cl.
CPC ......... *B60W 30/06* (2013.01); *B62D 15/0285* (2013.01); *G08G 1/146* (2013.01);
(Continued)

(58) Field of Classification Search
CPC ... B60W 30/06; B60W 30/08; B62D 15/0285; G08G 1/146; G08G 1/161; G08G 1/168;
(Continued)

(56) References Cited

U.S. PATENT DOCUMENTS

| 8,825,535 B2 * | 9/2014 | Weik, III | ................ G08G 1/14 705/28 |
| 8,831,970 B2 * | 9/2014 | Weik, III | ........... G06Q 20/3276 705/28 |

(Continued)

FOREIGN PATENT DOCUMENTS

| CN | 101561680 A | * 10/2009 | ............... G05D 1/02 |
| CN | 106575476 A | * 4/2017 | ........... G05D 1/0027 |

(Continued)

OTHER PUBLICATIONS

Maron M, DE102017218536A1—published date: Apr. 2019 translated to English from Google Patents.*

*Primary Examiner* — Cuong H Nguyen
(74) *Attorney, Agent, or Firm* — Fox Rothschild LLP

(57) ABSTRACT

A vehicle is provided to automatically move according to a movement request received from a surrounding vehicle already parked when the vehicle is parked around the surrounding parked vehicle. The vehicle includes a communication unit and a sensor sensing an external surrounding. A steering device steers the vehicle wheels and a power device transmits power to the wheels. In response to receiving vehicle identification information and movement request from the surrounding parked vehicle through the communication unit, a controller determines whether the surrounding vehicle has an authority for the movement request based on the external surrounding and the vehicle identification information. The power device and the steering device are operated based on the movement request when the surrounding parked vehicle has the authority.

17 Claims, 6 Drawing Sheets

(51) Int. Cl.
*G08G 1/16* (2006.01)
*G08G 1/14* (2006.01)
*B60W 30/08* (2012.01)

(52) U.S. Cl.
CPC .............. *G08G 1/161* (2013.01); *G08G 1/168* (2013.01); *B60W 30/08* (2013.01); *G05D 2201/0212* (2013.01); *G08G 1/162* (2013.01); *G08G 1/165* (2013.01); *G08G 1/166* (2013.01)

(58) Field of Classification Search
CPC ........ G08G 1/162; G08G 1/165; G08G 1/166; G08G 1/144; G05D 2201/0212
USPC ..................................................... 701/36, 26
See application file for complete search history.

(56) References Cited

U.S. PATENT DOCUMENTS

| | | | | |
|---|---|---|---|---|
| 10,286,904 | B2 * | 5/2019 | Yaldo ...................... | H04W 4/46 |
| 10,409,290 | B2 * | 9/2019 | Mielenz ................. | B60W 30/06 |
| 10,579,061 | B2 * | 3/2020 | Kim ................... | B62D 15/0285 |
| 10,593,129 | B2 * | 3/2020 | Bruce .................... | G06Q 10/02 |
| 10,643,242 | B2 * | 5/2020 | Rowe ....................... | G08G 1/14 |
| 10,732,622 | B2 * | 8/2020 | Bettger ................. | B60W 50/14 |
| 10,780,879 | B2 * | 9/2020 | Izumi ................. | B62D 15/0285 |
| 10,789,847 | B2 * | 9/2020 | Maruiwa ................ | G08G 1/149 |
| 10,867,514 | B2 * | 12/2020 | Nordbruch ......... | G01C 21/3407 |
| 10,889,323 | B2 * | 1/2021 | Derendarz ......... | B62D 15/0285 |
| 11,037,446 | B2 * | 6/2021 | Graf ....................... | G08G 1/141 |
| 11,183,059 | B2 * | 11/2021 | Zhou ...................... | G08G 1/146 |
| 11,377,096 | B2 * | 7/2022 | Fan ....................... | G06Q 50/30 |
| 11,395,107 | B1 * | 7/2022 | Lei .......................... | H04W 4/06 |
| 2017/0267233 | A1 * | 9/2017 | Minster ................. | B62D 15/02 |
| 2019/0111917 | A1 * | 4/2019 | Kim ...................... | G07C 5/0841 |
| 2019/0113933 | A1 * | 4/2019 | Ha ....................... | G05D 1/0088 |
| 2020/0086853 | A1 * | 3/2020 | Kumar ................. | G05D 1/0088 |

FOREIGN PATENT DOCUMENTS

| | | | | | |
|---|---|---|---|---|---|
| CN | 107804318 | A | * | 3/2018 | ............ B60W 10/04 |
| CN | 110603460 | A | * | 12/2019 | ............ B60W 30/06 |
| DE | 102009051463 | A1 | * | 5/2011 | .............. B62D 1/00 |
| DE | 102017218536 | A1 | * | 4/2019 | ............... G08G 1/14 |
| DE | 102009005566 | B4 | * | 10/2020 | .............. G01S 11/12 |
| EP | 2758296 | B1 | * | 7/2016 | ........... B62D 15/027 |
| KR | 20170027635 | A | | 3/2017 | |
| KR | 20190045554 | A | | 5/2019 | |
| WO | WO-2018108293 | A1 | * | 6/2018 | .......... H04W 12/069 |

* cited by examiner

VEHICLE AND CONTROL METHOD THEREOF

CROSS-REFERENCE TO RELATED APPLICATION

This application claims the benefit of Korean Patent Application No. 10-2019-0089789, filed on Jul. 24, 2019, the disclosure of which is incorporated herein by reference.

BACKGROUND

1. Technical Field

The present invention relates to a vehicle, and more particularly, to a vehicle that moves in response to a movement request when parked around another parked vehicle already and a control method thereof.

2. Description of the Related Art

In general, a vehicle may be parked around or blocking another vehicle already parked if there is no parking space. In other words, when no parking spaces are available, a driver of the vehicle may double park the vehicle which prevents the departure of the other vehicle that is already parked. In particular, the other parked vehicle may now be blocked from the double parked vehicle.

SUMMARY

Therefore, the disclosure provides a vehicle and a control method thereof capable of automatically moving according to a movement request received from another vehicle already parked when the vehicle is parked around the other parked vehicle.

In accordance with an aspect of the disclosure, a vehicle may include: a communication unit; a sensor configured to sense an external surrounding; a steering device configured to steer the wheels of the vehicle; a power device configured to transmit power to the wheels; and a controller, configured to, in response to receiving vehicle identification information and movement request from a surrounding vehicle through the communication unit, determine whether the surrounding vehicle has an authority for the movement request based on the external surrounding and the vehicle identification information, and operate the power device and the steering device based on the movement request when determined to have the authority.

The sensor may include at least one of a camera configured to obtain image data of the external surrounding of the vehicle, a radar configured to obtain radar data of the external surrounding of the vehicle, and an ultrasonic sensor configured to obtain ultrasonic data of the external surrounding of the vehicle. The controller may be configured to identify at least one vehicle parked adjacently based on at least one of the image data, the radar data, or the ultrasonic data, determine whether the at least one vehicle includes the surrounding vehicle based on the vehicle identification information, and determine that the surrounding vehicle has an authority for the movement request when the surrounding vehicle is included in the at least one vehicle.

The controller may further be configured to determine a movement distance and a movement angle based on the movement request and at least one of the image data, the radar data or the ultrasonic data, and operate the power device and the steering device based on the determined movement distance and movement angle. The controller may be to configured to operate the communication unit to transmit the movement request to a parking vehicle when the parking vehicle is located in the movement trajectory according to the determined movement distance and the movement angle.

Additionally, the controller may be configured to update the determined movement distance and the movement angle to prevent collision with the parking vehicle when the parking vehicle is located in the movement trajectory according to the determined movement distance and the movement angle. The controller may be configured to operate the power device and the steering device based on a control signal from the surrounding vehicle in response to determining that the surrounding vehicle has the authority for the movement request. The controller may be configured to operate the communication unit to transmit the external surrounding, the vehicle identification information and a message requesting the authority for the movement request of the surrounding vehicle to a terminal device corresponding to the vehicle and determine whether the surrounding vehicle has authority for the movement request based on a reply message received from the terminal device in response to the message.

The controller may be configured to operate the power device and the steering device based on a control signal from the terminal device in response to determining that the surrounding vehicle lacks the authority based on the reply message. The controller may be configured to operate the power device and the steering device to move to a parking space when the surrounding vehicle exits the parking space according to the movement request.

In accordance with another aspect of the disclosure, a control method of a vehicle including a communication unit, a sensor configured to sense an external surrounding, a steering device configured to steer the vehicle wheels and a power device configured to transmit power to the wheels, may include: determining whether a surrounding vehicle has an authority for a movement request based on the external surrounding and a vehicle identification information in response to receiving the vehicle identification information and the movement request from the surrounding vehicle through the communication unit; and operating the power device and the steering device based on the movement request when determined to have the authority.

The sensor may include at least one of a camera configured to obtain image data of the external surrounding of the vehicle, a radar configured to obtain radar data of the external surrounding of the vehicle, or an ultrasonic sensor configured to obtain ultrasonic data of the external surrounding of the vehicle. In addition, the determining of whether the surrounding vehicle has the authority for the movement request, may include: identifying at least one vehicle parked adjacently based on at least one of the image data, the radar data, or the ultrasonic data; determining whether the at least one vehicle includes the surrounding vehicle based on the vehicle identification information; and determining that the surrounding vehicle has the authority for the movement request when the surrounding vehicle is included in the at least one vehicle Further, the operating of the power device and the steering device, may include: determining a movement distance and a movement angle based on the movement request and at least one of the image data, the radar data or the ultrasonic data; and operating the power device and the steering device based on the determined movement distance and movement angle The control method may further include: operating the communication unit to transmit the movement request to a parking vehicle when the parking vehicle is located in the movement trajectory according to the determined movement distance and the movement angle. The determined movement distance and the movement angle may be updated to prevent collision with the parking vehicle when the parking vehicle is located in the movement trajectory according to the determined movement distance and the movement angle.

The operating of the power device and the steering device, may include: operating the power device and the steering device based on a control signal from the surrounding vehicle in response to determining that the surrounding vehicle has the authority for the movement request. The determining of whether the surrounding vehicle has the authority for the movement request, may include: operating the communication unit to transmit the external surrounding, the vehicle identification information and a message requesting the authority for the movement request of the surrounding vehicle to a terminal device corresponding to the vehicle; and determining whether the surrounding vehicle has the authority for the movement request based on a reply message received from the terminal device in response to the message.

The control method may further include: operating the power device and the steering device based on a control signal from the terminal device in response to determining that the surrounding vehicle lacks the authority based on the reply message. The power device and the steering device may then be operated to move to the parking space when the surrounding vehicle exits the parking space according to the movement request

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
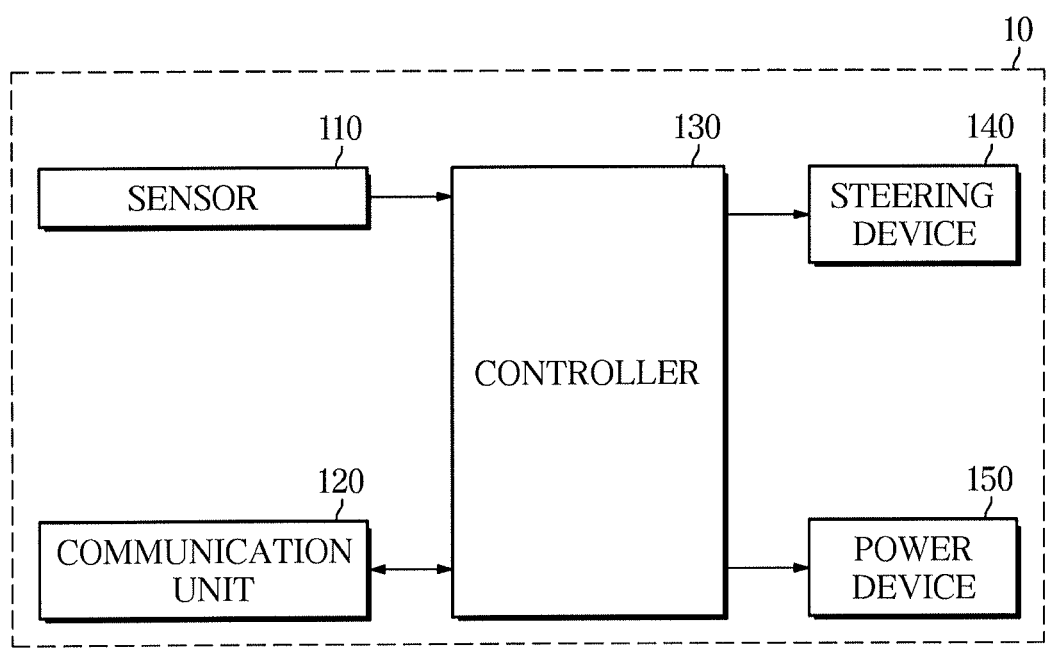
FIG. 1 is a control block diagram of a vehicle according to an exemplary embodiment.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Like reference numerals refer to like elements throughout the specification. Not all elements of embodiments of the disclosure will be described, and description of what are commonly known in the art or what overlap each other in the exemplary embodiments will be omitted.

It will be understood that when an element is referred to as being "connected" to another element, it can be directly or indirectly connected to the other element, wherein the indirect connection includes "connection" via a wireless communication network. As used herein, the terms "portion," "unit," "block," "member," and "module" refer to a unit that can perform at least one function or operation. For example, these terms may refer to at least one process which is performed by at least one piece of hardware such as a field-programmable gate array (FPGA) and an application specific integrated circuit (ASIC), and at least one piece of software stored in a memory or a processor. An identification code is used for the convenience of the description but is not intended to illustrate the order of each step. Each of the steps may be implemented in an order different from the illustrated order unless the context clearly indicates otherwise.

Hereinafter, exemplary embodiments of a vehicle and a method of controlling the vehicle according to an aspect will be described in detail with reference to the accompanying drawings.

FIG. 1 is a control block diagram of a vehicle according to an exemplary embodiment. Referring to FIG. 1, a vehicle 10 according to an exemplary embodiment may include a sensor 110 configured to sense an external surrounding, a communication unit 120 configured to communicate with a vehicle parked or an external terminal device, a controller 130 configured to determine whether to move the vehicle (e.g., subject vehicle) based on a movement request from a vehicle (e.g., a surrounding vehicle) parked around the subject vehicle and configured to adjust the movement, operate a steering device 140 for steering the wheels of the vehicle, and a power device 150 configured to transmit power to the wheel.

The sensor 110 according to an exemplary embodiment may be configured to measure the external surrounding of the vehicle 10. In particular, the sensor 110 may be configured to identify a surrounding vehicle located outside the vehicle 10 and identify an object such as an obstacle located outside the vehicle 10. The sensor 110 may include at least one of a camera (not shown) configured to obtain image data of the external surrounding of the vehicle 10, a radar (not shown) configured to obtain radar data regarding the external surrounding of the vehicle 10 or an ultrasonic sensor (not shown) configured to obtain ultrasonic data regarding the external surrounding of the vehicle 10.

The camera, radar, and ultrasonic sensors included in the sensor 110 may be disposed at the front, rear, and side surfaces of the vehicle 10 main body to sense an external surrounding of the vehicle 10. The location and number of cameras and radars are not limited as long as the location and number of cameras and radars are capable of sensing the external surrounding of the vehicle 10. The communication unit 120 according to an exemplary embodiment may be configured to communicate with surrounding vehicle or an external terminal device using wireless communication.

According to one exemplary embodiment, the wireless communication may include cellular communication using at least one of 5G (5th generation), LTE, LTE Advance (LTE-A), code division multiple access (CDMA), wideband CDMA (WCDMA), universal mobile telecommunications system (UMTS), wireless broadband (WiBro) or global system for mobile communications (GSM). According to one exemplary embodiment, the wireless communication may include at least one of wireless fidelity (WiFi), Bluetooth, Bluetooth low power (BLE), Zigbee, near field communication (NFC), magnetic secure transmission, radio frequency (RF) or a body area network (BAN). However, the present invention is not limited to the above example, and any communication protocol capable of performing wireless communication may be used without limitation.

In particular, the communication unit 120 may be configured to receive a signal for vehicle identification information and a movement request from another vehicle (e.g., a surrounding vehicle) parked around the vehicle 10 (e.g., subject vehicle). In other words, the surrounding vehicle may be parked in a location proximate to the subject vehicle such that the subject vehicle blocks the surrounding vehicle when the subject vehicle is parked. The communication unit 120 may be configured to transmit a signal for vehicle identification information and a movement request to a surrounding vehicle parked around the vehicle 10. The vehicle identification information corresponds to information for identifying a vehicle that is the subject of the transmission, and may include a vehicle number, a color of the vehicle, a type of vehicle, a shape of the vehicle, and the like. However, the information included in the vehicle identification information is not limited to the above example and may be included without limitation as long as it corresponds to information for identifying a vehicle.

In addition, when the communication unit 120 receives a movement request from a surrounding vehicle parked around the vehicle 10 under the operation of the controller 130, according to an exemplary embodiment, the communication unit 120 may be configured to transmit the external surrounding obtained through the sensor (110), received vehicle identification information of the surrounding vehicle, and a message requesting the authority for the movement request of the surrounding vehicle to a terminal device of a preregistered vehicle owner. In addition, according to an exemplary embodiment, the communication unit 120 may be configured to receive a reply message for a message requesting authority for a movement request of a surrounding vehicle from the terminal device of a preregistered vehicle owner.

According to an exemplary embodiment, when the controller 130 receives vehicle identification information and a movement request from a surrounding vehicle via the communication unit 120, the controller 130 may be configured to determine whether the surrounding vehicle has authority for movement requests based on the external surrounding obtained through the sensor 110 and the vehicle identification information. In particular, the controller 130 may be configured to identify at least one vehicle that is parked adjacently (e.g., adjacent to the subject vehicle) based on at least one of image data, radar data, or ultrasonic data regarding an external surrounding. In other words, the controller 130 may be configured to obtain information regarding a vehicle number, a color of a vehicle, and a type of vehicle, a shape of the vehicle of each of at least one vehicle parked adjacently based on at least one of image data, radar data, or ultrasound data obtained using the sensor 110.

Subsequently, the controller 130 may be configured to determine whether the surrounding vehicle transmitting the movement request is included in the at least one vehicle identified based on the vehicle identification information of the surrounding vehicle transmitting the movement request. In other words, the controller 130 may be configured to compare the information regarding the at least one vehicle identified based on at least one of the image data, the radar data, or the ultrasonic data with the vehicle identification information of a surrounding vehicle that has transmitted the movement request. In addition, the controller 130 may be configured to determine whether the surrounding vehicle is included in at least one vehicle parked adjacently to the subject vehicle.

When a surrounding vehicle is included in at least one vehicle, the controller 130 may be configured to determine that the surrounding vehicle has an authority for a movement request. In other words, the controller 130 may be configured to automatically grant the authority for the movement request to a vehicle that is parked adjacently to the subject vehicle based on vehicle identification information of the parked vehicle obtained based on the data of the sensor 110. The controller 130 may be configured to store a list of the at least one vehicle based on vehicle identification information of each the vehicles parked adjacent to the subject vehicle.

At this time, when the data of the sensor 110 is updated according to the change of vehicle parked adjacent to the subject vehicle, the controller 130 may be configured to update a list of vehicles based on the updated data. In addition, according to an exemplary embodiment, when receiving a movement request from a surrounding vehicle, the controller 130 may be configured to update the list of vehicles parked adjacently based on the data of the sensor 110. In addition, the controller 130, may be configured to operate communication unit 120 to transmit the external surrounding obtained using the sensor 110, vehicle identification information of the surrounding vehicle, and a message requesting the authority for the movement request of the surrounding vehicle to a terminal device corresponding to the subject vehicle 10, that is, to a terminal device of a preregistered vehicle owner.

The controller 130 may then be configured to determine whether a surrounding vehicle has an authority for the movement request based on the reply message received from the terminal device. At this time, the controller 130 may be configured to operate the power device 150 and the steering device 140 based on a control signal from the terminal device in response to determining that the surrounding vehicle transmitting the movement request lacks the authority for the movement request based on the reply message received form terminal device.

On the other hand, the controller 130 may be configured to operate the steering device 140 and the power device 150 based on the movement request in response to determining that the surrounding vehicle transmitting the movement request has authority for the movement request. In particular, the controller 130 may be configured to determine a movement distance and a movement angle based on the movement request and at least one of image data, radar data, or ultrasound data regarding an external surrounding obtained using the sensor 110 and operate the steering device 140 and the power device 150 based on the determined movement distance and the movement angle.

In addition, the controller 130 may be configured to operate the steering device 140 and the power device 150 based on a control signal from a surrounding vehicle that transmits the movement request. In other words, the controller 130 may be configured to receive a control signal that corresponds to a movement request from a surrounding vehicle via the communication unit 120, and operate the steering device 140 and power device 150 to move the vehicle 10 based on the control signal.

The controller 130 may be configured to determine a movement distance and a movement angle based on at least one of image data, radar data, or ultrasound data for an external surrounding and a movement request, when a parked vehicle is located in the movement trajectory according to the determined movement distance and the movement angle, operate the communication unit 120 to transmit the movement request to the parked vehicle. In other words, when the parked vehicle is located in the movement trajectory, the controller 130 may be configured to transmit a movement request to the parked vehicle to cause the parked vehicle in the movement trajectory to move. Particularly, the parking vehicle may be configured to determine whether the vehicle 10 has an authority for the movement request, and move based on the movement request in response to determining that the vehicle 10 has an authority.

After the parked vehicle located in a movement trajectory (e.g., a trajectory for movement to unblock a vehicle) moves, the controller 130 may be configured to operate the steering device 140 and the power device 150 based on the determined movement distance and the movement angle, thereby moving according to the movement trajectory. The controller 130 may be configured to determine a movement distance and a movement angle based on at least one of image data, radar data, or ultrasound data for an external surrounding and a movement request, and update the determined movement distance and the movement angle to prevent collision with the parked vehicle when the parked vehicle is located in the movement trajectory according to the determined movement distance and the movement angle The controller 130 may be configured to operate the power device 150 and the steering device 140 to move to a parking space when the surrounding vehicle exits the parking space where the surrounding vehicle transmitting movement request is located after the movement according to the movement request. The controller 130 may include at least one memory in which a program for performing the above-described operation and the operation described below is stored, and at least one processor for executing the stored program. In the case of a plurality of memories and processors, they may be integrated in one chip or may be provided in physically separated locations.

The steering device 140 according to an exemplary embodiment may be configured to adjust the driving direction of the vehicle 10 by steering the wheels (e.g., adjust the direction of the wheels to adjust the moving direction of the vehicle). In other words, the steering device 140 may steer the wheels according to the operation of the controller 130. The power device 150 may be configured to transmit power to the wheels to drive the vehicle 10. In other words, the power device 150 may be configured to transmit power to the wheel under the operation of the controller 130. In particular, the power device 150 may correspond to an engine driven by fossil fuel or a motor driven by electricity, based on the vehicle type. In the above, each configuration of the vehicle 10 has been described in detail. Hereinafter, movement of the vehicle 10 with respect to the movement request will be described in detail.

Figure 2:
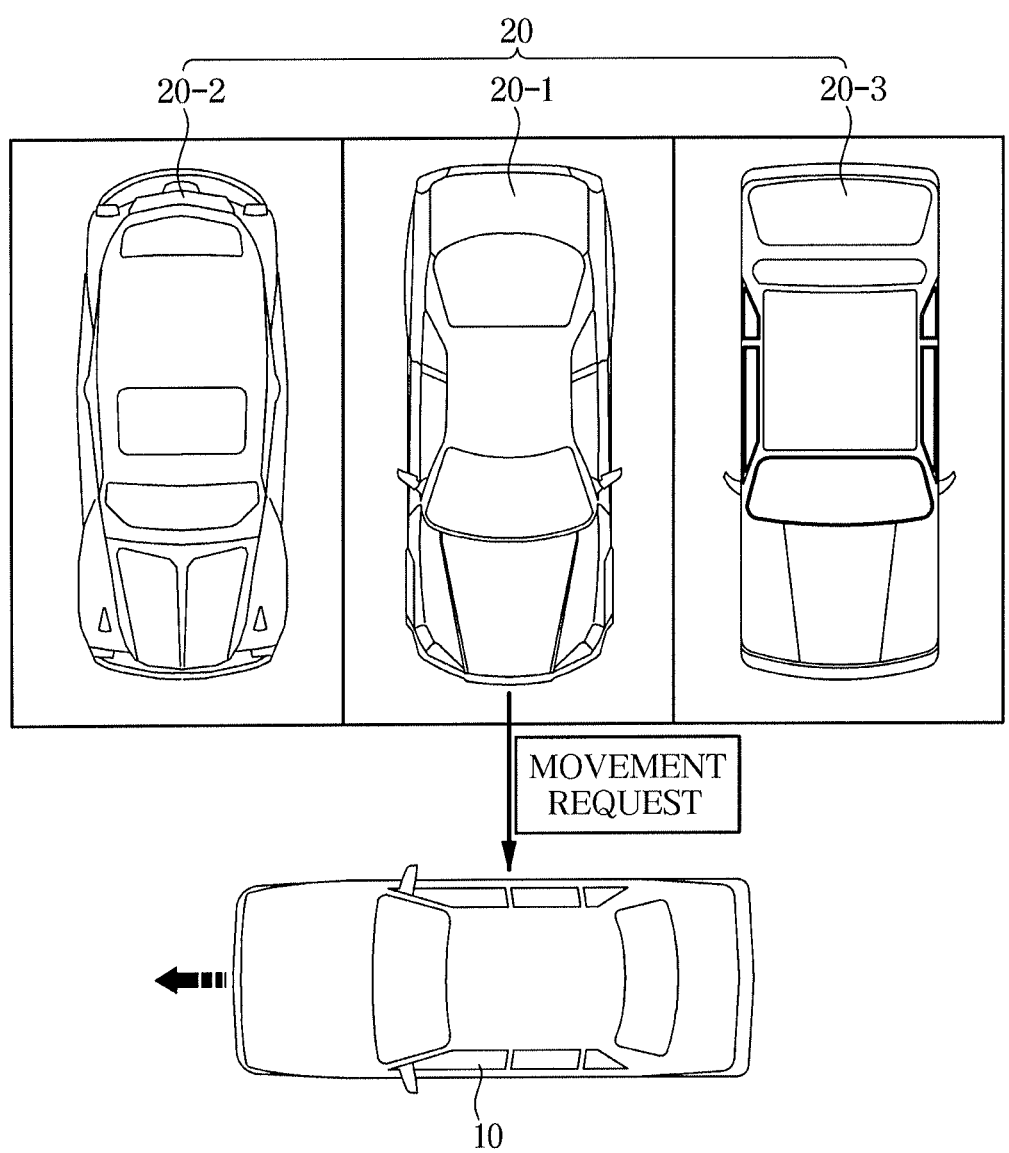
FIG. 2 is a diagram illustrating a case in which a vehicle moves based on a movement request according to an exemplary embodiment.

FIG. 2 is a diagram illustrating a case in which a vehicle moves based on a movement request according to an exemplary embodiment. Referring to FIG. 2, the vehicle 10 (e.g., subject vehicle) according to an exemplary embodiment may be parked around the surrounding vehicle 20 when there is no available parking space. In other words, the subject vehicle 10 may be parked in a location that blocks the surrounding vehicle 20 from exiting a parking space. Accordingly, even when surrounding vehicle 20 intends to exit the parking space, the surrounding vehicle 20 may not be able to exit due to the positioning of the double-parked vehicle 10.

For example, as shown in FIG. 2, a surrounding vehicle 20-1 may be blocked by the vehicle 10 and may not be able to exit the parking space. In particular, the vehicle 10 may be configured to receive a movement request to exit the parking space from the surrounding vehicle 20-1. The vehicle 10 according to an exemplary embodiment may be configured to receive vehicle identification information and a movement request from a surrounding vehicle 20-1 through the communication unit 120.

Additionally, the vehicle 10 may be configured to determine whether a surrounding vehicle 20-1 has an authority for a movement request based on an external surrounding obtained using the sensor 110 and vehicle identification information. In particular, according to an exemplary embodiment, the controller 130 may be configured to identify at least one vehicle 20-1, 20-2, 20-3 that is parked adjacently (e.g., to the subject vehicle) based on at least one of image data, radar data, or ultrasonic data about an external surrounding. In FIG. 2, three other vehicles 20 (e.g., three surrounding vehicles) parked adjacent to the vehicle 10 are illustrated, but the present invention is not limited thereto, and the number of surrounding vehicles 20 parked adjacent to the vehicle 10 is not limited.

In other words, the controller 130 may be configured to obtain information regarding a vehicle number, a vehicle color, a vehicle type, and a vehicle shape of each surrounding vehicle 20-1, 20-2, 20-3 (e.g., a first surrounding vehicle, a second surrounding vehicle, and a third surrounding vehicle) parked adjacent to the subject vehicle based on at least one of image data, radar data, or ultrasound data of the external surrounding obtained using the sensor 110. Subsequently, the controller 130 may be configured to determine whether the surrounding vehicle 20-1 transmitting the movement request is included in the at least one vehicle 20-1, 20-2, 20-3 identified based on the vehicle identification information of the surrounding vehicle 20-1 transmitting the movement request.

In other words, the controller 130 may be configured to compare the information about the vehicles 20-1, 20-2, 20-3 identified based on at least one of the image data, the radar data, or the ultrasonic data with the vehicle identification information of a surrounding vehicle that has transmitted the movement request. Accordingly, the controller 130 may be configured to determine whether the surrounding vehicle is one of the surrounding vehicles 20-1, 20-2, 20-3 parked adjacent to the subject vehicle 10. When the surrounding vehicle 20-1 is one of the surrounding vehicles 20-1, 20-2, 20-3 parked adjacent to the subject vehicle 10, the controller 130 may be configured to determine that the surrounding vehicle 20-1 has an authority for a movement request.

Accordingly, the controller 130 may be configured to automatically grant the authority for the movement request to each of the surrounding vehicles 20-1, 20-2, 20-3 parked adjacent to the subject vehicle based on vehicle identification information of each surrounding vehicle 20-1, 20-2, 20-3 parked adjacently obtained based on the data of the sensor 110. In other words, the controller 130 may be configured to store a list of the surrounding vehicles 20-1, 20-2, 20-3 based on vehicle identification information of each surrounding vehicle 20-1, 20-2, 20-3 parked adjacent to the subject vehicle 10.

When the data of the sensor 110 is updated according to the change of at least one vehicle 20-1, 20-2, 20-3 parked adjacent to the subject vehicle 10, the controller 130 may be configured to update a list of at least one vehicle parked adjacently based on the updated data. In addition, when receiving a movement request from a surrounding vehicle 20-1, the controller 130 may be configured to update the list of at least one vehicle parked adjacently based on the data of the sensor 110.

In addition, the controller 130 may be configured to operate communication unit 120 to transmit the external surrounding obtained using the sensor 110, vehicle identification information of the surrounding vehicle 20-1, and a message requesting the authority for the movement request of the surrounding vehicle 20-1 to a terminal device corresponding to the vehicle 10, that is, to a terminal device of a preregistered vehicle owner.

The controller 130 may then be configured to determine whether a surrounding vehicle 20-1 has an authority for the movement request based on the reply message received from the terminal device. The controller 130 may be configured to operate the power device 150 and the steering device 140 based on a control signal from the terminal device when the controller determines that the surrounding vehicle 20-1 transmitting the movement request lacks the authority for the movement request based on the reply message received form terminal device.

On the other hand, the controller 130 may be configured to operate the steering device 140 and the power device 150 based on the movement request in response to determining that the surrounding vehicle 20-1 transmitting the movement request has authority for the movement request. In other words, the vehicle 10 may move to allow a surrounding vehicle 20-1 to exit a parking space by operating the steering device 140 and the power device 150 according to the movement request. In particular, the controller 130 may be configured to determine a movement distance and a movement angle based on the movement request and at least one of image data, radar data, or ultrasound data regarding an external surrounding obtained using the sensor 110 and operate the steering device 140 and the power device 150 based on the determined movement distance and the movement angle.

In addition, the controller 130 may be configured to operate the steering device 140 and the power device 150 based on a control signal from a surrounding vehicle 20-1 that transmits the movement request. In other words the controller 130 may be configured to receive a control signal that corresponds to a movement request from a surrounding vehicle 20-1 via the communication unit 120, and operate the steering device 140 and power device 150 to move the vehicle 10 based on the control signal.

Figure 3:
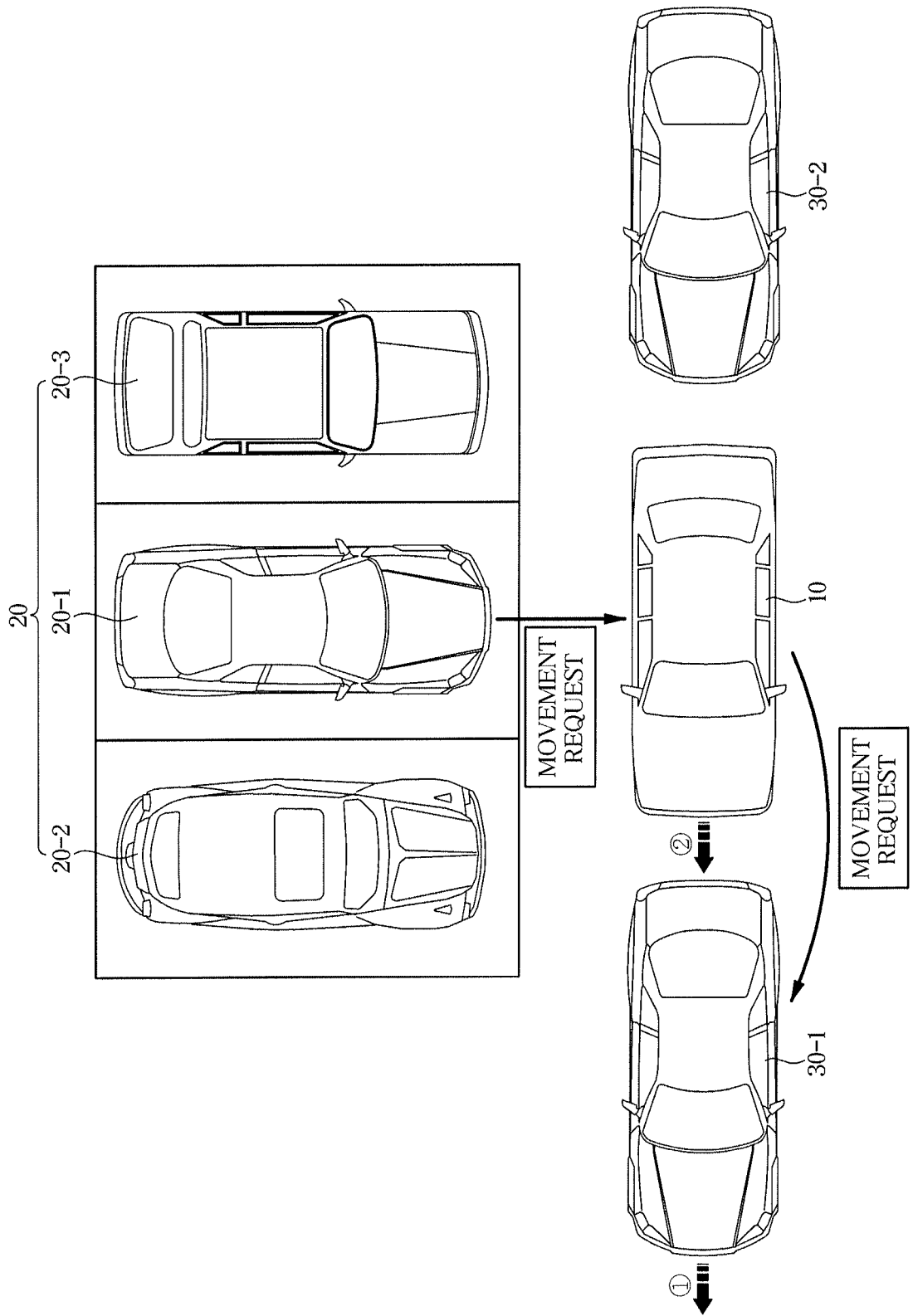
FIG. 3 and FIG. 4 are views illustrating a vehicle is parked when the vehicle moves according to a movement request according to an exemplary embodiment.
Figure 4:
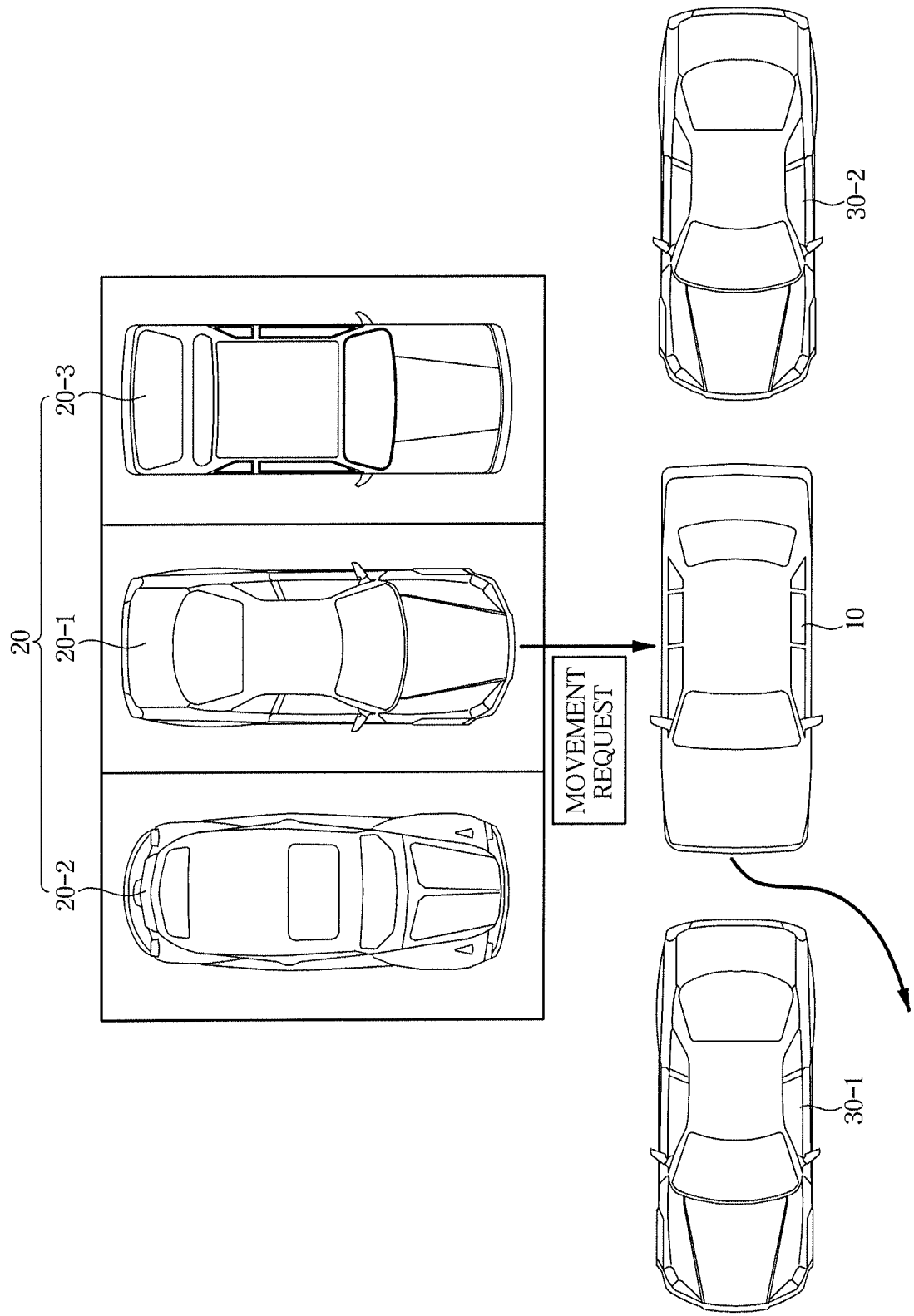

FIG. 3 and FIG. 4 are views illustrating a vehicle parked when the vehicle moves according to a movement request according to an exemplary embodiment. Referring to FIG. 3, the controller 130 may be configured to determine a movement distance and a movement angle based on at least one of image data, radar data, or ultrasound data for an external surrounding and a movement request, when a parked vehicle is located in the movement trajectory according to the determined movement distance and the movement angle, may be configured to operate the communication unit 120 to transmit the movement request to the parked vehicle.

Specifically, as shown in FIG. 3, when the movement distance and the movement angle are determined as the vehicle 10 moves forward based on the movement request from the surrounding vehicle 20-1, the double-parked vehicle 30-1 may be located in the movement trajectory according to the determined movement distance and the movement angle. In other words, when a parking vehicle 30-1 is located in the movement trajectory to be moved, the controller 130 may be configured to transmit a movement request to the parking vehicle 30-1 to cause the parking vehicle 30-1 in the movement trajectory to move. Particularly, the parking vehicle 30-1 may be configured to determine whether the subject vehicle 10 has an authority for the movement request, and move based on the movement request in response to determining that the vehicle 10 has an authority.

After the parking vehicle 30-1 located in the movement trajectory to moves, the controller 130 may be configured to operate the steering device 140 and the power device 150 based on the determined movement distance and the movement angle, thereby moving according to the movement trajectory. However, unlike shown in FIG. 3, when the vehicle 10 determines the movement distance and the movement angle of the backward movement trajectory, the vehicle 10 may be configured to transmit a movement request to a parking vehicle 30-2 located at the rear of the vehicle 10.

In addition, the vehicle 10, according to an exemplary embodiment, as shown in FIG. 4, may be configured to determine a movement distance and a movement angle based on at least one of image data, radar data, or ultrasound data for an external surrounding and a movement request, and update the determined movement distance and the movement angle to prevent collision with the parking vehicle 30 when the parking vehicle 30 is located in the movement trajectory according to the determined movement distance and the movement angle.

Figure 5:
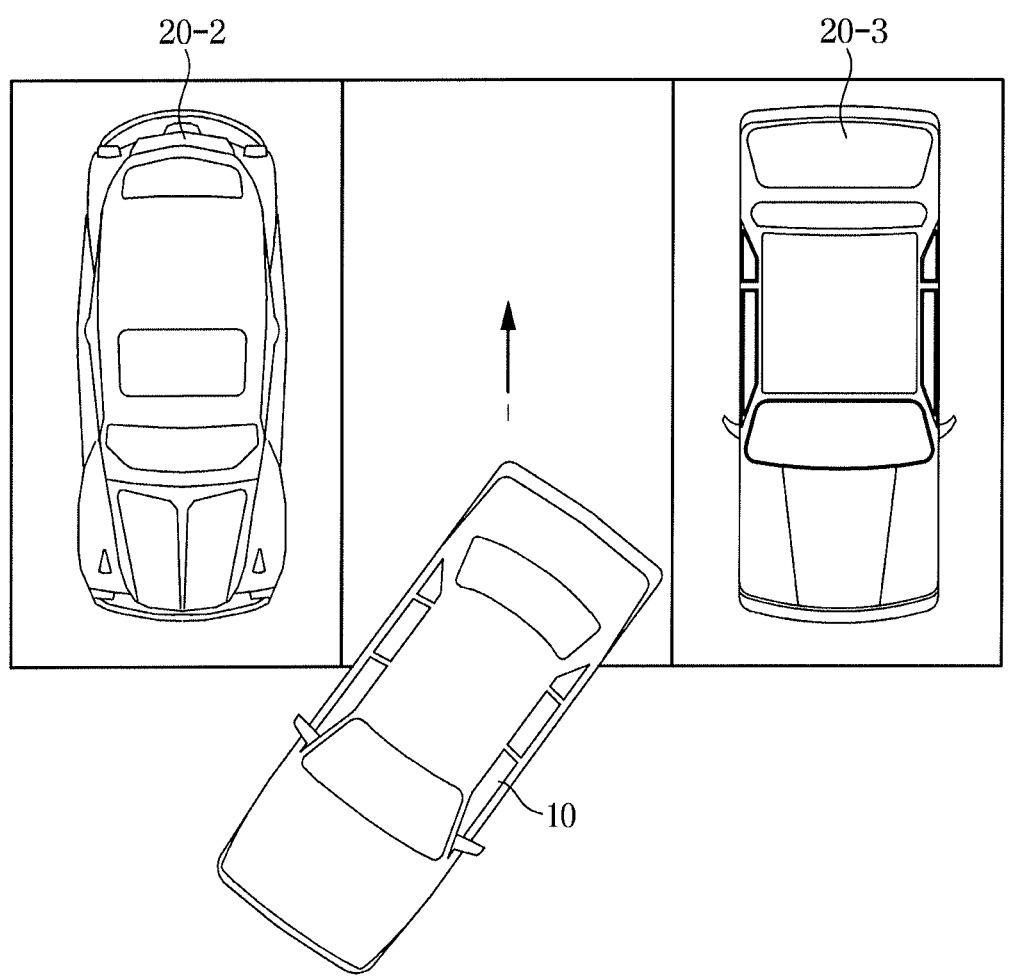
FIG. 5 is a diagram illustrating a vehicle according to an exemplary embodiment parking in a parking space where another vehicle exits the parking space.

FIG. 5 is a diagram illustrating a vehicle according to an exemplary embodiment parking in a parking space where a surrounding vehicle exits. Referring to FIG. 5, the vehicle 10 may be configured to operate the power device 150 and the steering device 140 to move to a parking space when the surrounding vehicle 20-1 exits the parking space where the surrounding vehicle 20-1 transmitting movement request is located after the movement according to the movement request.

Hereinafter, a control method of the vehicle 10 according to an exemplary embodiment will be described. The vehicle 10 according to the above-described exemplary embodiment may be applied to the control method of the vehicle 10 to be described later. Therefore, the contents described above with reference to FIGS. 1 to 5 may be equally applicable to the control method of the vehicle 10 according to an exemplary embodiment even if there is no particular mention.

Figure 6:
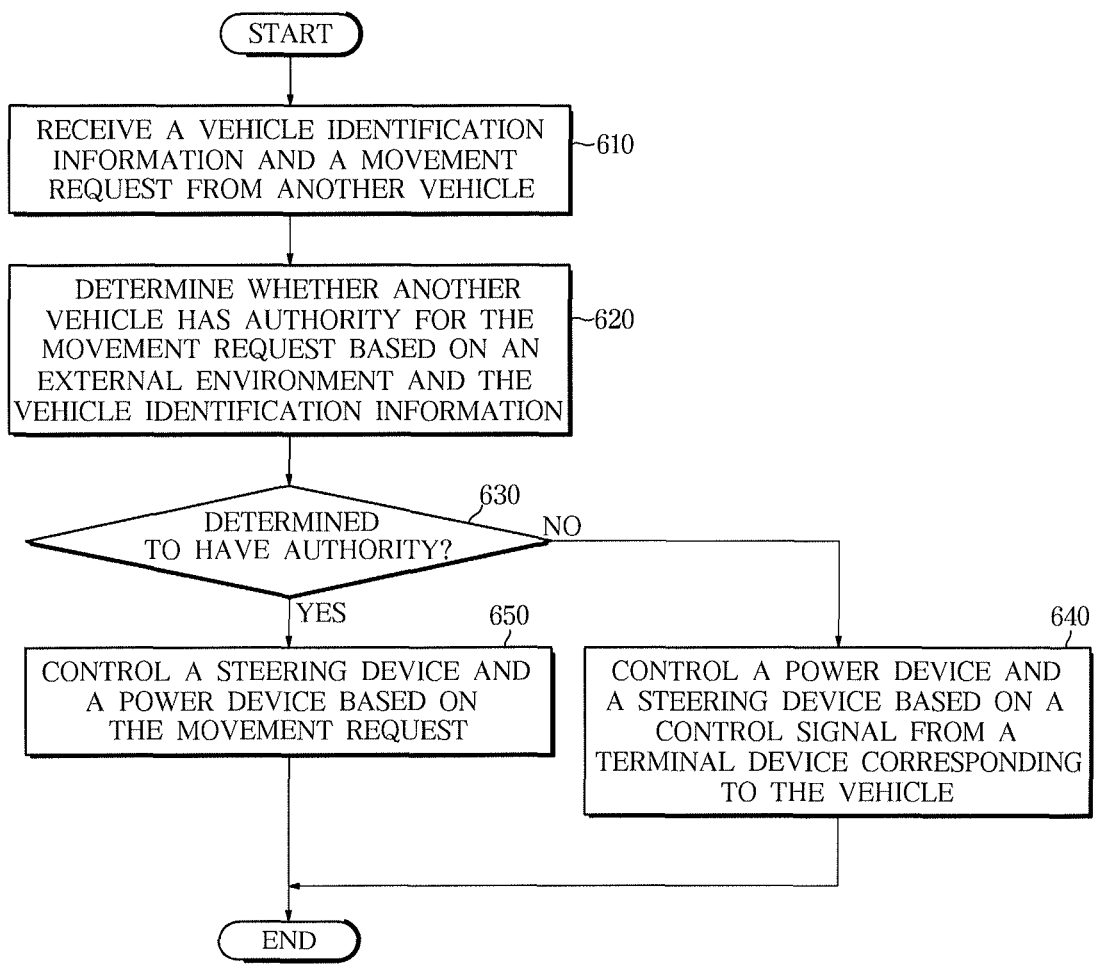
FIG. 6 is a flowchart illustrating a vehicle moving according to a movement request of another vehicle in a control method of a vehicle according to an exemplary embodiment.

FIG. 6 is a flowchart illustrating a vehicle moves according to a movement request of a surrounding vehicle in a control method of a vehicle according to an exemplary embodiment. The method described herein below may be executed by a controller. Referring to FIG. 6, the vehicle 10 may be configured to receive a vehicle identification information and a movement request from a surrounding vehicle (610) and determine whether a surrounding vehicle has authority for the movement request based on the external surrounding and vehicle identification information (620).

According to an exemplary embodiment, when the controller 130 receives vehicle identification information and a movement request from a surrounding vehicle via the communication unit 120, the controller 130 may be configured to determine whether the surrounding vehicle has authority for movement requests based on the external surrounding obtained using the sensor 110 and the vehicle identification information.

In particular, the controller 130 may be configured to identify at least one vehicle that is parked adjacently based on at least one of image data, radar data, or ultrasonic data about an external surrounding. In other words, the controller 130 may be configured to obtain information regarding a vehicle number, a vehicle color, a vehicle type, and a vehicle shape of each vehicle parked adjacently based on at least one of image data, radar data, or ultrasound data regarding the external surrounding obtained using the sensor 110.

Subsequently, the controller 130 may be configured to determine whether the surrounding vehicle transmitting the movement request is included in the at least one vehicle identified based on the vehicle identification information of the surrounding vehicle transmitting the movement request. In other words, the controller 130 may be configured to compare the information regarding the at least one vehicle identified based on at least one of the image data, the radar data, or the ultrasonic data with the vehicle identification information of a surrounding vehicle that has transmitted the movement request. Additionally, the the controller 130 may be configured to determine whether the surrounding vehicle is included in at least one vehicle parked adjacently.

When a surrounding vehicle is included in the at least one vehicle, the controller 130 may be configured to determine that the surrounding vehicle has an authority for a movement request. In addition, the controller 130 may be configured to operate a communication unit 120 to transmit the external surrounding obtained using the sensor 110, vehicle identification information of the surrounding vehicle, and a message requesting the authority for the movement request of the surrounding vehicle to a terminal device corresponding to the vehicle 10, that is, to a terminal device of a preregistered vehicle owner.

The controller 130 may then be configured to determine whether a surrounding vehicle has an authority for the movement request based on the reply message received from the terminal device. At this time, the controller 130 may be configured to operate the power device 150 and the steering device 140 based on a control signal from the terminal device corresponding to the vehicle 10 (640) when the controller determines that the surrounding vehicle transmitting the movement request lacks the authority for the movement request based on the reply message received form terminal device (NO of 630).

The controller 130 may be configured to operate the steering device 140 and the power device 150 based on the movement request (650) in response to determining that the surrounding vehicle transmitting the movement request has authority for the movement request (YES of 630). In particular, the controller 130 may be configured to determine a movement distance and a movement angle based on the movement request and at least one of image data, radar data, or ultrasound data regarding an external surrounding obtained using the sensor 110 and operate the steering device 140 and the power device 150 based on the determined movement distance and the movement angle. In addition, the controller 130 may be configured to operate the steering device 140 and the power device 150 based on a control signal from a surrounding vehicle that transmits the movement request, according to an exemplary embodiment.

According to a vehicle and a control method thereof according to an aspect, when parked around a vehicle that is already parked, a subject vehicle may automatically move according to a movement request received from the parked vehicle. Thus, the owner of the parked vehicle may not use physical force to move the vehicle, and the risk of an accident may be reduced.

Meanwhile, the disclosed exemplary embodiments may be implemented in the form of a recording medium storing instructions that are executable by a computer. The instructions may be stored in the form of a program code, and when executed by a processor, the instructions may generate a program module to perform operations of the disclosed embodiments. The recording medium may be implemented as a non-transitory computer-readable recording medium.

The non-transitory computer-readable recording medium may include all types of recording media storing commands that can be interpreted by a computer. For example, the computer-readable recording medium may be ROM, RAM, a magnetic tape, a magnetic disc, flash memory, an optical data storage device, etc.

The exemplary embodiments of the disclosure have thus far been described with reference to the accompanying drawings. It will be obvious to those of ordinary skill in the art that the disclosure may be practiced in other forms than the exemplary embodiments as described above without changing the technical idea or essential features of the disclosure. The above exemplary embodiments are only by way of example, and should not be interpreted in a limited sense.

What is claimed is:

1. A vehicle comprising:
   a communication unit;
   a sensor configured to sense an external surrounding of the vehicle;
   a steering device configured to steer wheels of the vehicle;
   a power device configured to transmit power to the wheels; and
   a controller, in response to receiving vehicle identification information and movement request from a surrounding vehicle via the communication unit, configured to:
   determine whether the surrounding vehicle has an authority for the movement request based on the external surrounding of the vehicle and the vehicle identification information,
   operate the power device and the steering device based on the movement request in response to determining that the surrounding vehicle has the authority for the movement request,
   identify at least one vehicle parked adjacently to the vehicle based on the external surrounding of the vehicle sensed by the sensor;
   determine whether the at least one vehicle includes the surrounding vehicle based on the external surrounding of the vehicle and the vehicle identification information;
   determine that the surrounding vehicle has the authority for the movement request when the surrounding vehicle is included in the at least one vehicle;
   determine a movement distance and a movement angle based on the movement request and sensing results of the sensor; and
   operate the power device and the steering device based on the determined movement distance and movement angle.

2. The vehicle according to claim 1, wherein the sensor includes at least one selected from the group consisting of: a camera configured to obtain image data of the external surrounding of the vehicle, a radar configured to obtain radar data of the external surrounding of the vehicle, and an ultrasonic sensor configured to obtain ultrasonic data of the external surrounding of the vehicle.

3. A control method of a vehicle including a communication unit, a sensor configured to sense an external surrounding of the vehicle, a steering device configured to steer wheels of the vehicle and a power device configured to transmit power to the wheels, comprising:
   determining, by a controller, whether a surrounding vehicle has an authority for a movement request based on the external surrounding of the vehicle and a vehicle identification information in response to receiving the vehicle identification information and the movement request from the surrounding vehicle via the communication unit; and
   operating, by the controller, the power device and the steering device based on the movement request in response to determining that the surrounding vehicle has the authority for the movement request,
   wherein the determining of whether the surrounding vehicle has the authority for the movement request, includes:
   identifying, by the controller, at least one vehicle parked adjacently to the vehicle based on the external surrounding of the vehicle sensed by the sensor;
   determining, by the controller, whether the at least one vehicle includes the surrounding vehicle based on the external surrounding of the vehicle and the vehicle identification information; and
   determining, by the controller, that the surrounding vehicle has the authority for the movement request when the surrounding vehicle is included in the at least one vehicle,
   wherein the operating of the power device and the steering device, includes:
   determining by the controller, a movement distance and a movement angle based on the movement request and sensing results of the sensor; and
   operating by the controller, the power device and the steering device based on the determined movement distance and movement angle.

4. The vehicle according to claim 1, wherein the controller is configured to grant the authority for the movement request to the identified at least one vehicle.

5. The control method according to claim 3, wherein the sensor includes at least one the group consisting of: a camera configured to obtain image data of the external surrounding of the vehicle, a radar configured to obtain radar data of the external surrounding of the vehicle, and an ultrasonic sensor configured to obtain ultrasonic data of the external surrounding of the vehicle.

6. The vehicle according to claim 1, wherein the controller is configured to operate the communication unit to transmit the movement request to a parking vehicle when the parking vehicle is located in a movement trajectory according to the determined movement distance and the movement angle.

7. The vehicle according to claim 1, wherein the controller is configured to update the determined movement distance and the movement angle to prevent collision with the parking vehicle when the parking vehicle is located in the movement trajectory according to the determined movement distance and the movement angle.

8. The vehicle according to claim 2, wherein the controller is configured to operate the power device and the steering device based on a control signal from the surrounding vehicle in response to determining that the surrounding vehicle has the authority for the movement request.

9. The vehicle according to claim 2, wherein the controller is configured to:
   operate the communication unit to transmit the external surrounding, the vehicle identification information and a message requesting the authority for the movement request of the surrounding vehicle to a terminal device corresponding to the vehicle; and
   determine whether the surrounding vehicle has authority for the movement request based on a reply message received from the terminal device in response to the message.

10. The vehicle according to claim 9, wherein the controller is configured to operate the power device and the steering device based on a control signal from the terminal device in response to determining that the surrounding vehicle has no authority based on the reply message.

11. The vehicle according to claim 2, wherein the controller is configured to operate the power device and the steering device to move toward a parking space when the surrounding vehicle exits the parking space according to the movement request.

12. The control method according to claim 5, further comprising:
   operating, by the controller, the power device and the steering device to move toward the parking space when the surrounding vehicle leaves the parking space according to the movement request.

13. The control method according to claim 5, wherein the operating of the power device and the steering device, includes:
    operating, by the controller, the power device and the steering device based on a control signal from the surrounding vehicle in response to determining that the surrounding vehicle has the authority for the movement request.

14. The control method according to claim 5, wherein the determining of whether the surrounding vehicle has the authority for the movement request, includes:
    operating, by the controller, the communication unit to transmit the external surrounding, the vehicle identification information and a message requesting the authority for the movement request of the surrounding vehicle to a terminal device corresponding to the vehicle; and
    determining, by the controller, whether the surrounding vehicle has the authority for the movement request based on a reply message received from the terminal device in response to the transmitted message.

15. The control method according to claim 14, further comprising:
    operating, by the controller, the power device and the steering device based on a control signal from the terminal device in response to determining that the surrounding vehicle has no the authority based on the reply message.

16. The control method according to claim 3, further comprising:
    operating, by the controller, the communication unit to transmit the movement request to a parking vehicle when the parking vehicle is located in the movement trajectory based on the determined movement distance and the movement angle.

17. The control method according to claim 3, further comprising:
    updating, by the controller, the determined movement distance and the movement angle to prevent collision with the parking vehicle when the parking vehicle is located in the movement trajectory based on the determined movement distance and the movement angle.

* * * * *